(12) United States Patent
She et al.

(10) Patent No.: US 11,213,888 B2
(45) Date of Patent: Jan. 4, 2022

(54) ADDITIVE MANUFACTURED POWDER PROCESSING SYSTEM

(71) Applicant: UNITED TECHNOLOGIES CORPORATION, Farmington, CT (US)

(72) Inventors: Ying She, East Hartford, CT (US); Aaron T Nardi, East Granby, CT (US); John A Sharon, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1326 days.

(21) Appl. No.: 15/144,992

(22) Filed: May 3, 2016

(65) Prior Publication Data
US 2017/0320135 A1    Nov. 9, 2017

(51) Int. Cl.
| | |
|---|---|
| *B22F 1/00* | (2006.01) |
| *B33Y 70/00* | (2020.01) |
| *C21D 9/00* | (2006.01) |
| *B22F 5/00* | (2006.01) |
| *B22F 5/04* | (2006.01) |
| *B22F 12/00* | (2021.01) |
| *B22F 10/10* | (2021.01) |

(52) U.S. Cl.
CPC ............ *B22F 1/0085* (2013.01); *B33Y 70/00* (2014.12); *C21D 9/0006* (2013.01); *C21D 9/0062* (2013.01); *B22F 5/009* (2013.01); *B22F 5/04* (2013.01); *B22F 10/10* (2021.01); *B22F 12/00* (2021.01); *B22F 2998/10* (2013.01); *B22F 2999/00* (2013.01); *Y02P 10/25* (2015.11)

(58) Field of Classification Search
None
See application file for complete search history.

(56) References Cited

U.S. PATENT DOCUMENTS

| | | | |
|---|---|---|---|
| 3,576,540 A | 4/1971 | Fair et al. | |
| 3,869,300 A * | 3/1975 | Scheiber | B05D 7/22 427/182 |
| 4,385,929 A * | 5/1983 | Ichidate | B22F 1/0088 148/208 |

(Continued)

FOREIGN PATENT DOCUMENTS

| | | |
|---|---|---|
| CN | 104801721 A | 7/2015 |
| EP | 3192589 A1 | 7/2017 |

(Continued)

OTHER PUBLICATIONS

European Search Report dated Sep. 29, 2017 for European Patent Application No. 17169325.2.

(Continued)

*Primary Examiner* — Keith Walker
*Assistant Examiner* — Catherine P Smith
(74) *Attorney, Agent, or Firm* — Bachman & LaPointe, P.C.

(57) ABSTRACT

A system for treatment of atomized powder including a fluidized bed operable to treat feedstock alloy powders. A method of treating atomized powder including communicating an inert gas into a fluidized bed; communicating an atomized powder into the fluidized bed; and heating the atomized powder in the fluidized bed, eject the treated powders out of the fluidized bed to quench the powders.

9 Claims, 4 Drawing Sheets

(56) References Cited

U.S. PATENT DOCUMENTS

| | | |
|---|---|---|
| 4,722,298 A | 2/1988 | Rubin et al. |
| 4,746,547 A | 5/1988 | Brown et al. |
| 4,749,398 A | 6/1988 | Braun |
| 4,919,847 A * | 4/1990 | Barletta .................. C11D 1/22 427/212 |
| 5,083,364 A | 1/1992 | Olbrich et al. |
| 5,294,242 A * | 3/1994 | Zurecki .................. B22F 9/14 75/10.1 |
| 5,301,863 A | 4/1994 | Prinz et al. |
| 5,353,490 A | 10/1994 | Kukuljan |
| 6,312,525 B1 | 11/2001 | Bright et al. |
| 6,463,349 B2 | 10/2002 | White et al. |
| 6,502,294 B2 | 1/2003 | Kusmierczyk et al. |
| 6,598,279 B1 | 7/2003 | Morgan |
| 6,751,516 B1 | 6/2004 | Richardson |
| 6,940,037 B1 | 9/2005 | Kovacevic et al. |
| 7,020,539 B1 | 3/2006 | Kovacevic et al. |
| 7,527,664 B2 | 5/2009 | Jackson |
| 2002/0019683 A1 | 2/2002 | Dawn et al. |
| 2002/0147521 A1 | 10/2002 | Mok et al. |
| 2002/0184746 A1 | 12/2002 | Kusmierczyk et al. |
| 2005/0173380 A1 | 8/2005 | Carbone |
| 2005/0274661 A1 | 12/2005 | Jackson |
| 2009/0297725 A1 * | 12/2009 | Reynoldson .............. C23C 8/80 427/535 |
| 2016/0221084 A1 | 8/2016 | Klecka et al. |
| 2017/0173591 A1 | 6/2017 | She et al. |

FOREIGN PATENT DOCUMENTS

| | | |
|---|---|---|
| WO | 2014176045 A1 | 10/2014 |
| WO | 2015023438 A1 | 2/2015 |

OTHER PUBLICATIONS

European Office Action dated Feb. 22, 2019 issued for corresponding European Application No. 17169325.2.

* cited by examiner

ADDITIVE MANUFACTURED POWDER PROCESSING SYSTEM

STATEMENT REGARDING FEDERALLY SPONSORED RESEARCH OR DEVELOPMENT

This disclosure was made with Government support under contract W911NF-14-2-0011 awarded by the U.S. Army. The Government has certain rights in this disclosure.

BACKGROUND

The present disclosure relates to additive manufacturing and, more particularly, to processing additive manufacturing feedstock powder.

Precision engineered parts such as gas turbine components may be manufactured by an additive manufacturing operation such that features associated with conventional manufacturing processes, e.g., machining, forging, welding, casting, etc. can be eliminated to facilitate savings in cost, material, and time.

Metal alloy powders are often produced by a gas, centrifugal atomization process. Powder in this state is then supplied as feedstock for additive manufacturing, solid state consolidation, and other powder metallurgy processes. An issue with atomized powder may be that the microstructure of the individual powder particles can differ and be nonhomogeneous.

SUMMARY

A system for treatment of atomized powder according to one disclosed non-limiting embodiment of the present disclosure can include a fluidized bed operable to heat treat feedstock alloy powders, the feedstock alloy powders heat treated for microstructure control to hereby condition the feedstock alloy powders into a state to facilitate solid-state consolidation.

A further embodiment of the present disclosure may include wherein the feedstock alloy powders are degassed.

A further embodiment of the present disclosure may include an inert gas in communication with the fluidized bed.

A further embodiment of the present disclosure may include a quenching reservoir in communication with the fluidized bed.

A further embodiment of the present disclosure may include a three-way valve in communication with the quenching reservoir.

A further embodiment of the present disclosure may include a water bubbler, a fine powder collector and a quenching powder collector in communication with the three-way valve.

A further embodiment of the present disclosure may include a vibrator in communication with the fluidized bed and the line to a quenched powder collector to facilitate to eject the atomized powder.

A method of treating atomized powder according to one disclosed non-limiting embodiment of the present disclosure can include communicating an inert gas into a fluidized bed; communicating an atomized powder into the a fluidized bed; and heating the atomized powder in the fluidized bed, the feedstock alloy powders heat treated for microstructure control.

A further embodiment of the present disclosure may include communicating the atomized powder into a quenching reservoir.

A further embodiment of the present disclosure may include communicating the atomized powder from the quenching reservoir to a three way valve.

A further embodiment of the present disclosure may include communicating the atomized powder from the three way valve to a fine powder collector.

A further embodiment of the present disclosure may include communicating the atomized powder to the fine powder collector through a water bubbler.

A further embodiment of the present disclosure may include quenching the atomized powder.

A further embodiment of the present disclosure may include degassing the atomized powder.

A further embodiment of the present disclosure may include communicating the atomized powder from the three way valve to a quenched powder collector.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The components in the drawings are not necessarily to scale. Moreover, in the drawings, like reference numerals designate corresponding parts throughout the several views. The drawings that accompany the detailed description can be briefly described as follows.

DETAILED DESCRIPTION

Figure 1:
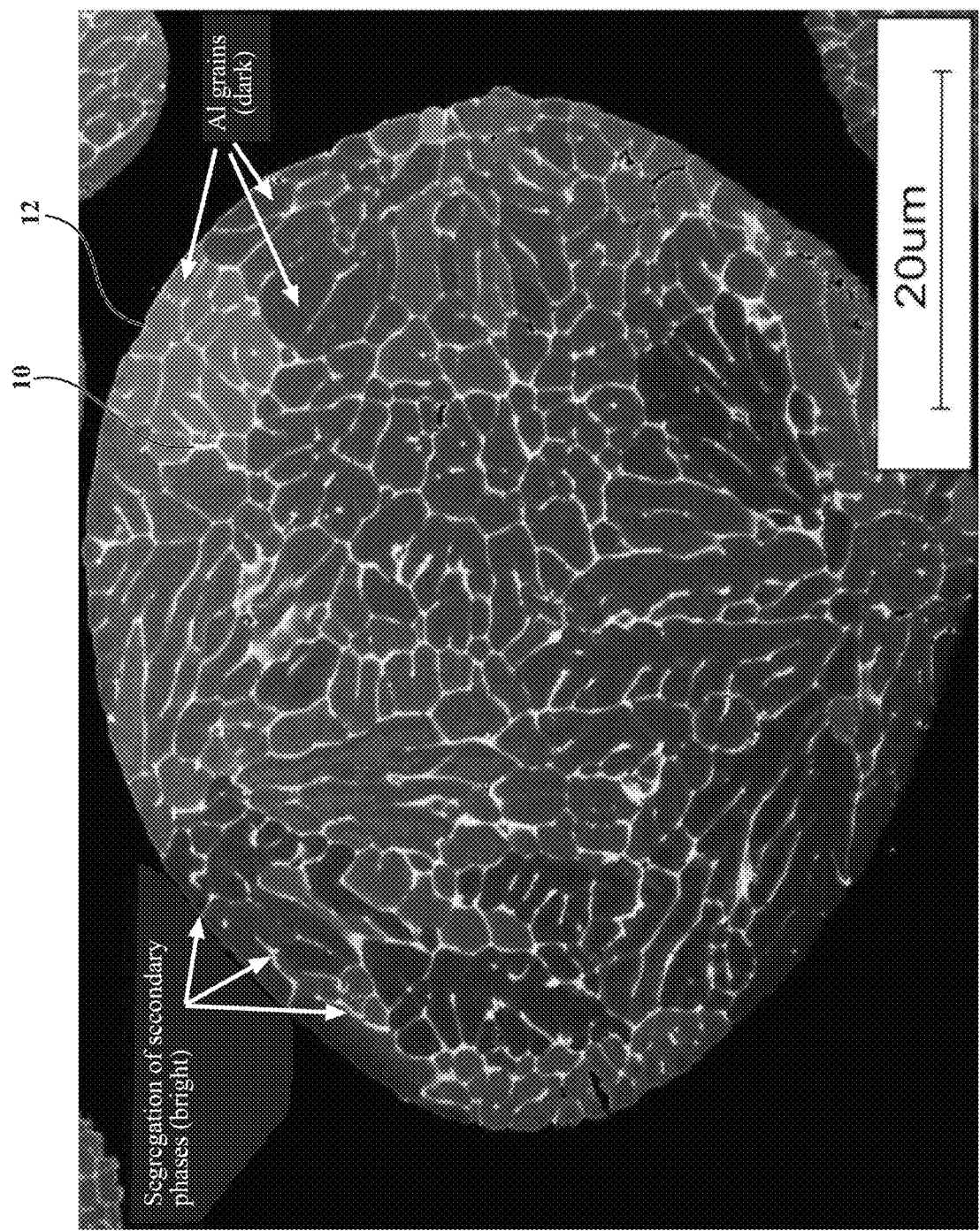
FIG. 1 is a micrograph of a powder particle of aluminum alloy 7075 (AA7075) in the as-atomized state with some alloy additions (bright), segregated to the boundaries.

With reference to FIG. 1, an issue with atomized powder may be that the microstructure of the individual powder particles can noticeably differ from the structure. For example, alloys can derive strength from additions that go into solid solution or precipitate out as well dispersed second phase particles can exhibit significant chemical segregation. For example, segregation is evident in powder particle 12 of aluminum alloy 7075 (AA7075) in the as-atomized state as some of the alloy additions (bright colored areas; 10) show clearly segregated boundaries.

For powder metallurgy techniques that require elevated temperatures i.e., melting or partial melting of the powder, the as-atomized feedstock condition may not be as much of a concern. However, for solid-state consolidation processes, such as cold spray that rely on plastic deformation of the powder particles, the feedstock microstructure may be relatively more critical. Excessive segregation in the as-atomized powder can be detrimental as clustering of alloy additions at the boundary/interface regions can result in a weakening or embrittling effect. The consequence may result in poor particle-particle bonding; in other words, the as-atomized powder microstructure inhibits the formation of robust bonds between particles.

Figure 2:
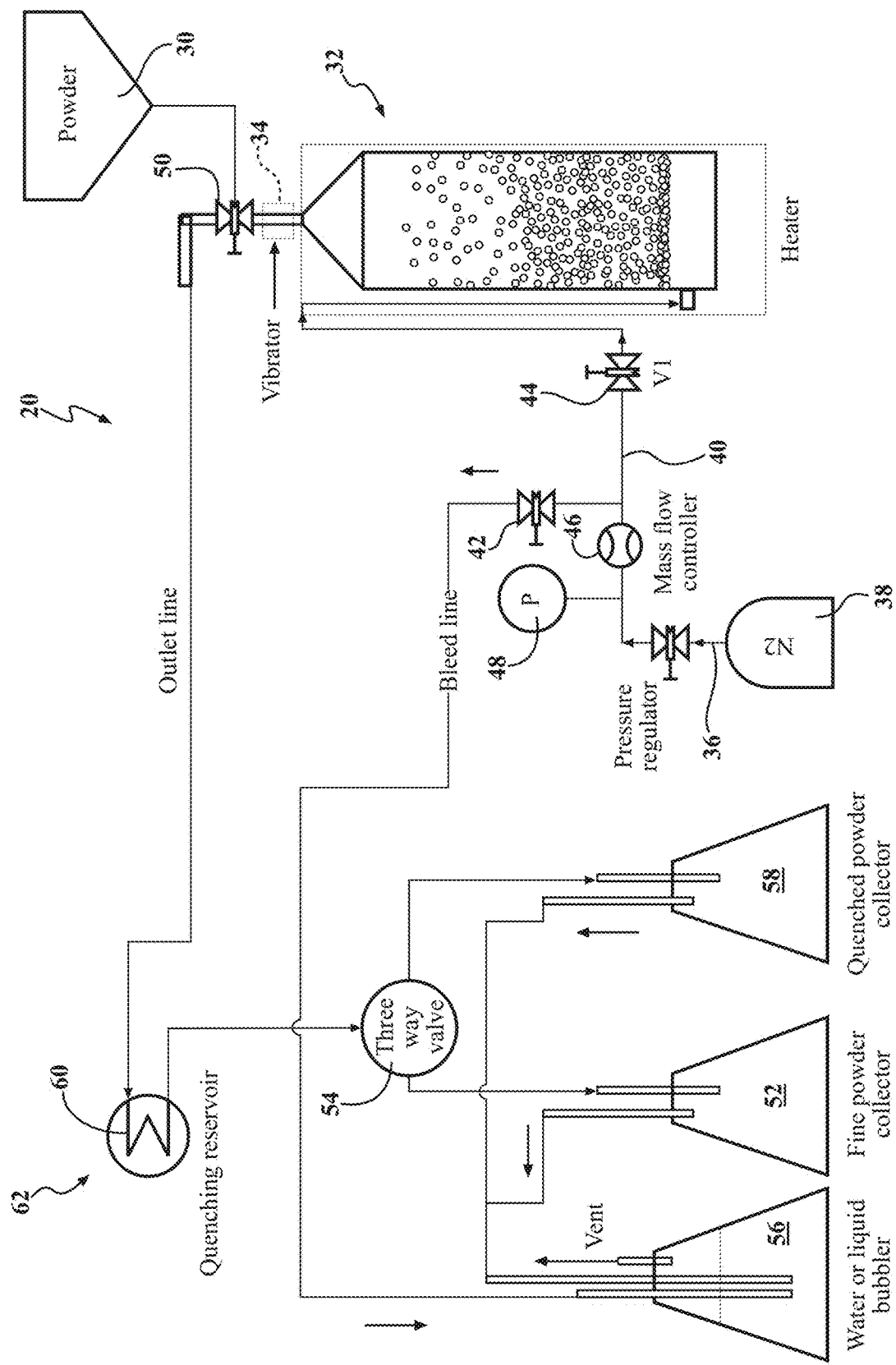
FIG. 2 is a system for treatment of atomized powders for an additive manufacturing process according to one disclosed non-limiting embodiment.

With reference to FIG. 2, a system 20 for treatment, e.g., heat treatment, degassing, etc., have atomized powders for an additive manufacturing process is schematically illustrated. The additive manufacturing process sequentially builds-up layers of atomized alloy material that include but are not limited to, steel alloys, stainless steel alloys, titanium alloys, nickel alloys, aluminum alloys and others in atomized powder material form. Nickel alloys may have specific benefit for parts that operate in high temperature environments, such as, for example, environments typically encountered by aerospace and gas turbine engine components.

Figure 3:
FIG. 3 is a micrograph of a heat treated as-atomized powder particle heat treated by the system of FIG. 2 to eliminate segregation and condition the powder into a state more ideal for solid state consolidation.

In one embodiment, the system 20 is operable to heat treat as-atomized powder to eliminate the segregations (FIG. 1) and thereby condition the powder into a state that is more ideal for solid-state consolidation (FIG. 3). The approach described herein begins with as-atomized feedstock and allows the powder to be subjected to a heat treatment to include but not limited to homogenization, solutionizing, quenching, and aging. Specifically, the process 100 (FIG. 4) provides for a powder treatment that utilized a fluidized bed that feeds into a quench reservoir connected to a powder collector.

Figure 4:
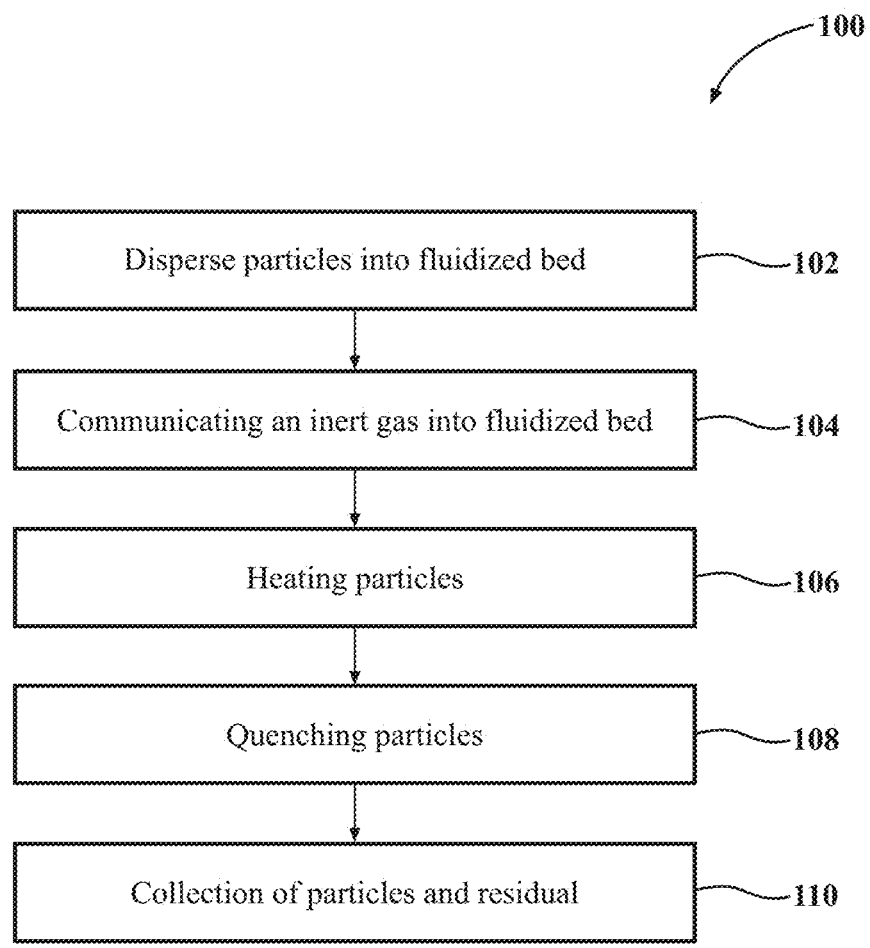
FIG. 4 is a process for treatment of atomized powders for an additive manufacturing process according to one disclosed non-limiting embodiment.

The powder 30 to be processed is loaded into a fluidized bed 32 via a valve 50 (Step 102; FIG. 4). An inert gas 36 such a nitrogen or argon from a tank 38 is introduced through a bleed line 40 with a relatively small flow rate while a valve 42 is open and valve 44 remains closed to avoid an initial gas burst in the fluidized bed 32. The inert gas 36 may be preheated or otherwise communicated into the fluidized bed 32.

The inert gas 36 is then directed into the fluidized bed 32 by opening valve 44 and closing valve 42 (Step 104; FIG. 4). A mass flow controller 46 and pressure sensor 48 may be utilized to control the inert gas. The inert gas flow rate is determined, for example, to fluidize the powder based on the properties of the powder and the gas, the treatment conditions (temperature and pressure), and the internal diameter of the fluidized bed. The fluidized bed 32 is then heated to a desired temperature for a desired time to achieve the desired treatment of the atomized powders, e.g., heat treatment, degassing, etc. (Step 106; FIG. 4). That is, the powder particles in the fluidized bed 32 are in full fluidization while being heated to avoid conglomeration of the particles.

When the powder has had sufficient time at temperatures within the fluidized bed 32, the powder is ejected by increasing the gas flow rate to the value 44. The particles leave the fluidized bed 32 through cooling coils 60 of a quench reservoir 62. The quench reservoir 62 can be filled with a variety of mediums such as, but not limited to, water, ice water, oil, dry ice, liquid nitrogen, liquid argon, liquid helium, etc., to provide right quenching medium temperatures, coupled with powder ejecting rates to control the quenching rate of the powder particles (Step 108; FIG. 4).

A valve 50 directs the inert gas exiting from the fluidized bed 32 to the fine powder collector 52 via the quenched powder collector 58 through a three-way valve 54, then vented through a water bubbler 56 (Step 110; FIG. 4). That is, the powder particles collected in the fine powder collector 52 and residual therefrom is collected in the water bubbler 56 to avoid ejection into the environment.

The system 20 enables the heat treatment of atomized powders to control powder particle microstructure for solid state consolidation applications. By controlling time, temperature, and cooling rate, the necessary regimen can be applied to the powder to influence chemical homogeneity, grain size, secondary phase growth, secondary phase distribution, etc. to attain the microstructural condition most favorable for desired solid-state consolidation. This process allows the powder particles to be subject to the same heat treat steps experienced by a conventional alloy ingot to include solutionizing, quenching, and aging. In addition, the process addresses key challenges of heat treating powder particles by working in an inert environment to limit oxidation and minimizing particle sintering, caking, and/or agglomeration.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method to heat treat as-atomized powder to reduce segregations and condition the powder into a state for solid-state consolidation, comprising:

communicating an inert gas into a fluidized bed, the inert gas exiting from the fluidized bed to a water bubbler;

communicating an atomized powder into the fluidized bed;

heating the atomized powder in the fluidized bed;

communicating the heated atomized powder from the fluidized bed into a quenching reservoir;

communicating the atomized powder from the quenching reservoir to a three-way valve;

communicating the atomized powder from the three-way valve to a quenched powder collector;

collecting powder particles from the three-way valve in a fine powder collector; and collecting residual from the powder particles in the water bubbler to avoid ejection into the environment.

2. The method as recited in claim 1, further comprising degassing the atomized powder.

3. The method as recited in claim 1, further comprising preheating the inert gas prior to the fluidized bed.

4. The method as recited in claim 1, further comprising heating the fluidized bed to a desired temperature for a desired time to achieve a desired treatment of the atomized powders.

5. The method as recited in claim 1, further comprising heating the fluidized bed to a desired temperature for a desired time to achieve heat treatment of the atomized powders.

6. The method as recited in claim 1, further comprising heating the fluidized bed to a desired temperature for a desired time to achieve degassing of the atomized powders.

7. The method as recited in claim 1, further comprising heating the fluidized bed to avoid conglomeration of the particles.

8. The method as recited in claim 1, further comprising vibrating the powder prior to the quenching reservoir.

9. The method as recited in claim 1, further comprising vibrating the powder prior to the fluidized bed.

* * * * *